United States Patent
Yoshimura

[11] 3,895,159
[45] July 15, 1975

[54] CRYOGENIC INSULATING MATERIAL

[75] Inventor: Kunihiko Yoshimura, Osaka, Japan

[73] Assignee: Ataka & Company, Ltd., Osaka, Japan

[22] Filed: Nov. 8, 1973

[21] Appl. No.: 414,069

[30] Foreign Application Priority Data
Dec. 29, 1972  Japan.................................. 48-2169
Nov. 13, 1972  Japan................................ 47-130988

[52] U.S. Cl.............. 428/227; 220/9 LG; 428/228; 428/229; 428/247
[51] Int. Cl............................................. B32b 5/18
[58] Field of Search......... 161/47, 88, 93, 157, 159, 161/160, 161, 227; 220/9 LG

[56] References Cited
UNITED STATES PATENTS

| | | | |
|---|---|---|---|
| 3,178,490 | 4/1965 | Petrino et al. ............... | 161/161 UX |
| 3,255,061 | 6/1966 | Dobbs........................... | 161/159 X |
| 3,274,046 | 9/1966 | Shannon et al................ | 161/157 X |
| 3,382,302 | 5/1968 | Marzocchi..................... | 161/159 X |
| 3,449,199 | 6/1969 | Mead............................. | 161/47 |
| 3,503,840 | 4/1968 | Parrish.......................... | 161/159 |
| 3,546,060 | 12/1970 | Happe et al................... | 161/161 X |
| 3,589,956 | 6/1971 | Krantz et al.................. | 161/157 X |
| 3,617,594 | 11/1971 | Willy............................. | 161/159 X |
| 3,644,168 | 2/1972 | Bank et al...................... | 161/161 X |
| 3,694,530 | 9/1972 | Wolfe............................ | 161/161 X |
| 3,752,695 | 8/1973 | Finelli........................... | 161/160 X |
| 3,769,376 | 10/1973 | Arbaud.......................... | 161/88 X |
| 3,788,937 | 1/1974 | Lee................................ | 161/159 X |

Primary Examiner—George F. Lesmes
Assistant Examiner—Alan T. McDonald
Attorney, Agent, or Firm—Allison C. Collard

[57] ABSTRACT

A cryogenic insulating material is shaped in conformity with the form of an article to be insulated and is made of a rigid polyurethane foam having a core layer including cells and inner and outer surface layers including hardly any cells. Glass fabric is embedded at least in the inner surface layer.

6 Claims, 5 Drawing Figures

CRYOGENIC INSULATING MATERIAL

BACKGROUND OF THE INVENTION

The present invention relates to cryogenic insulating materials, more particularly to a material for low-temperature insulation in the interior of tanks for storing liquefied oxygen, liquefied ethylene and like cryogenic materials as well as for external low-temperature insulation of apparatuses for producing such materials and piping systems therefor.

Throughout the specification and appended claims, the terms "inner" and "outer" are used with respect to the article to be thermally insulated. More specifically, inner refers to one side of an insulating material that faces the article when convering the article, whilst outer refers to the other side thereof.

Conventionally known as a low-temperature insulating material of the type described is foam glass sheet which is used singly or in the form of a composite material having a rigid polyurethane foam adhered to the foam glass sheet. The foam glass has the desired strength but a relatively high thermal conductivity and is therefore not satisfactory to use for low-temperature insulation. Moreover, it has the drawback of being expensive and inconvenient to handle because it is heavy. Although the rigid polyurethane foam achieves excellent low-temperature insulation with its low thermal conductivity which is about one-half that of foam glass, it is insufficient in strength and has to be used in combination with foam glass for reinforcement. However, rigid polyurethane foam undergoes marked expansion and contraction, so that the foam is subject to cracking at temperatures of below −100°C. Especially when the foam is subjected to a marked temperature drop, cracking takes place in its inner surface which develops progressively inward with the lapse of time to mitigate the insulation effect.

SUMMARY OF THE INVENTION

To overcome the foregoing problems, this invention provides a cryogenic insulating material which comprises a rigid polyurethane foam having a core layer including cells and inner and outer surface layers including hardly any cells and a glass fiber reinforcement embedded at least in the inner surface layer over the entire area thereof. The rigid polyurethane foam assures satisfactory low-temperature insulation, whilst the hard inner and outer surface layers having almost no cells strengthen the polyurethane foam. The reinforcement made of glass fibers and embedded in the inner surface layer further adds to the strength of the surface layer itself to prevent cracking. Moreover, the cryogenic insulating material of this invention has the noteworthy advantage that it can be molded in conformity with the shape of article to be thermally insulated and that it is lightweight and is therefore convenient to handle.

The present invention will be described below in greater detail with reference to accompanying drawings.

DESCRIPTION OF THE PREFERRED EMBODIMENTS

Figure 1:
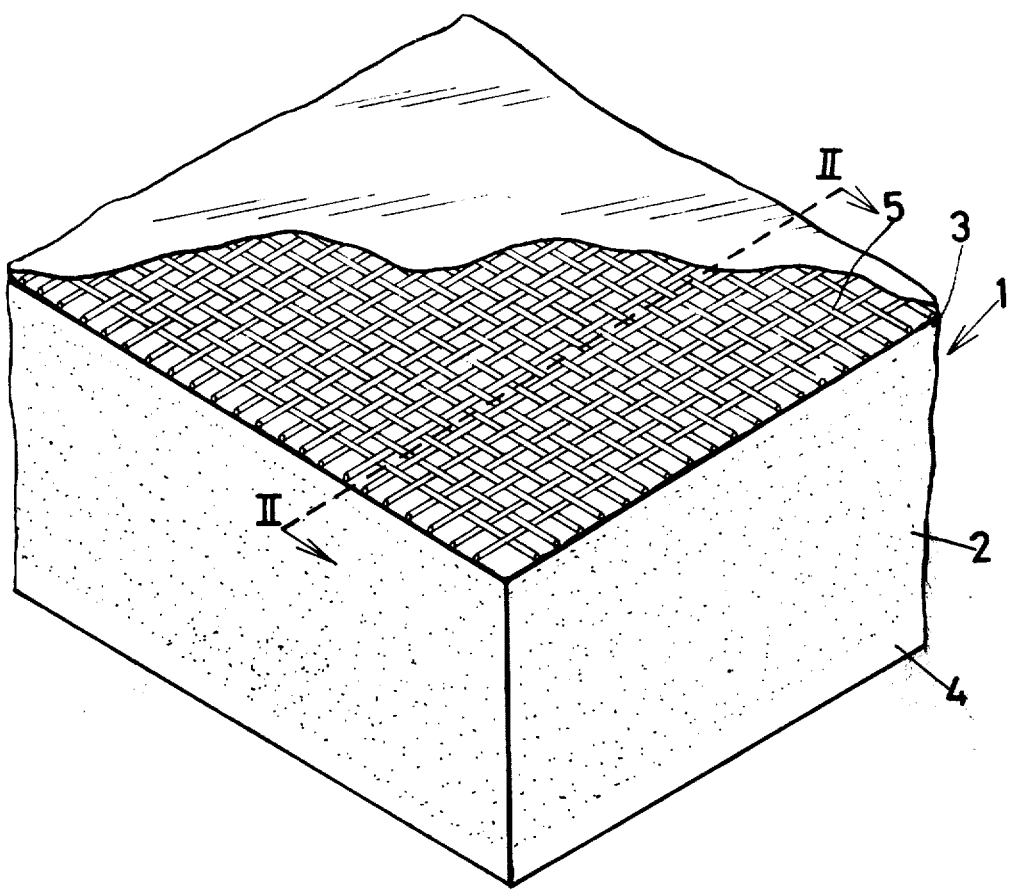
FIG. 1 is a perspective view showing an embodiment of the cryogenic insulating material in accordance with this invention, part of its inner surface layer being broken away to show a glass fiber reinforcement.
Figure 2:
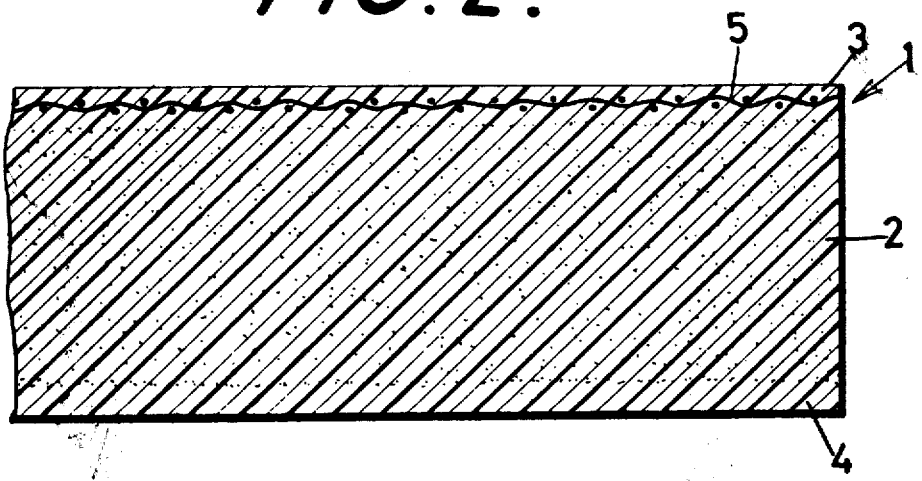
FIG. 2 is a view in section taken along the line II—II in FIG. 1.

With reference to FIGS. 1 and 2, there is shown a rigid polyurethane foam 1 including a core layer 2 and inner and outer surface layers 3 and 4. A reinforcement 5 made of a plain-woven glass fabric is embedded in the inner surface layer 3. The core layer 2 has a great number of cells, whereas the surface layers 3 and 4 include hardly any cells and are harder than the core layer 2.

To produce the rigid polyurethane foam, the reinforcement is first placed on the bottom of a mold and a liquid rigid polyurethane is poured into the mold, followed by foaming. The surface layer is formed by the surface of the mold on which the starting material is placed for molding, and the reinforcement is enclosed in the surface layer. The shape of the rigid polyurethane foam alters with the shape of an article to be thermally insulated. If the article is a tank, the insulating material is molded in the shape of a panel, whilst if it is a pipe, the insulating material is molded in the form of a pair of segments each having a semicircular cross section. For use with an apparatus or the like, the insulating material will be molded in conformity with the external shape of the article. Generally, the molding operation is carried out in the plant employing the desired mold but can also be conducted in situ. The reinforcement need not necessarily be a glass fabric but may alternatively be a glass mat.

The embodiment described is intended for internal low-temperature insulation of a tank to be installed in an atmospheric environment of 30°C to store LNG at −162°C. The rigid polyurethane foam 1 is 180 mm in thickness, and the surface layers 3 and 4 are each 1 mm in thickness. The glass fabric reinforcement 5 measures 0.47 mm in thickness and has a mesh construction provided by 8 × 8 thread elements per square inch. The rigid polyurethane foam 1 is put to use for low-temperature insulation, with the reinforcement enclosing surface layer 3 positioned on the lower temperature side. Consequently, when the insulating material is subjected to a marked temperature drop by LNG placed into the tank, the surface layer 3 having a higher density and the reinforcement 5 strengthening the layer prevent the rigid polyurethane foam 1 from cracking.

The foaming degree and thickness of the rigid polyurethane foam may vary suitably depending on the type of article to be insulated and atmospheric conditions. Preferably, the surface layer is 0.3 to 1.5 mm in thickness and the reinforcement is 0.2 to 1 mm in thickness. The glass fabric for reinforcement is preferably of a mesh construction of 6 × 6 to 20 × 20 thread elements per square inch.

Figure 3:
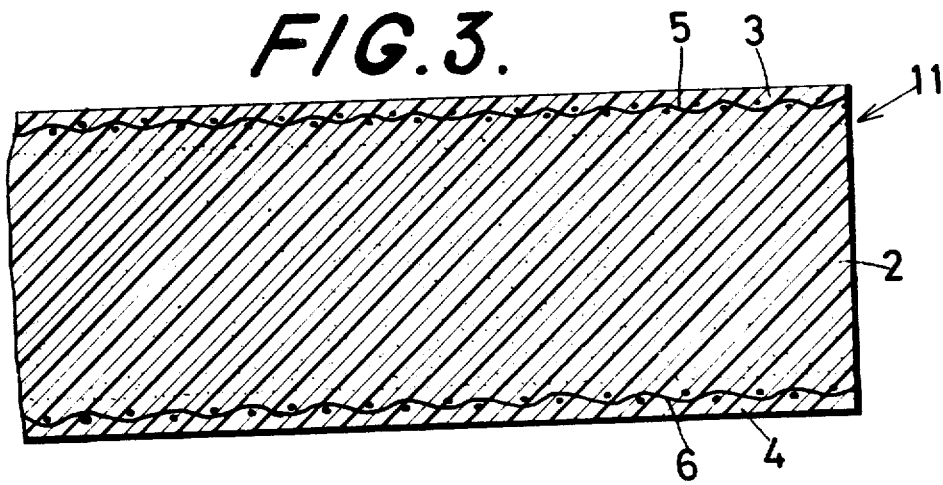
FIG. 3 is a view in section corresponding to FIG. 2 and showing another embodiment of the cryogenic insulating material of this invention, this embodiment including reinforcements embedded in the inner and outer surface layers thereof respectively.

FIG. 3 shows another embodiment of the low-temperature insulating material of this invention which is different from the first embodiment in that a glass fabric reinforcement 6 is embedded also in the outer surface layer 4 of a rigid polyurethane foam 11.

Figure 4:
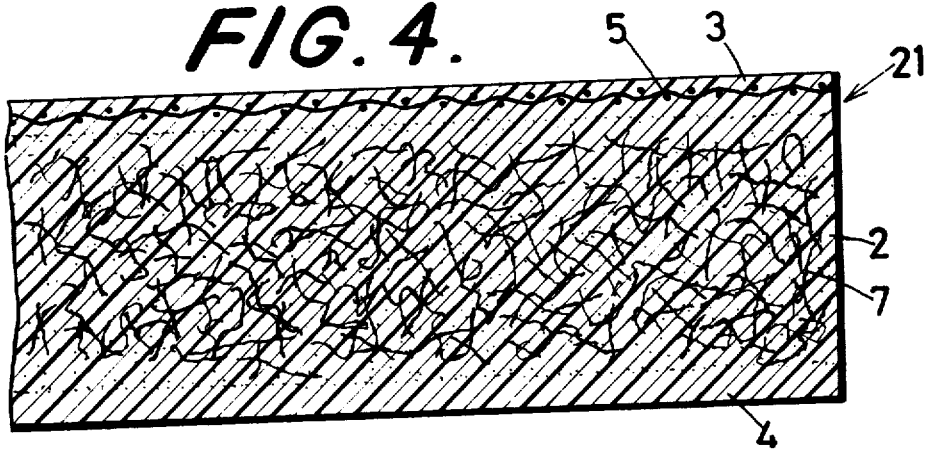
FIGS. 4 and 5 are views in section corresponding to FIG. 2 and showing other embodiments of the cryogenic insulating material of this invention respectively, each of the embodiments having wavy polyamide fibers embedded in its core layer in intersecting fashion, FIG. 4 showing one having a reinforcement only in the inner surface layer thereof, FIG. 5 showing the other embodiment having reinforcements embedded in the inner and outer surface layers respectively.
Figure 5:
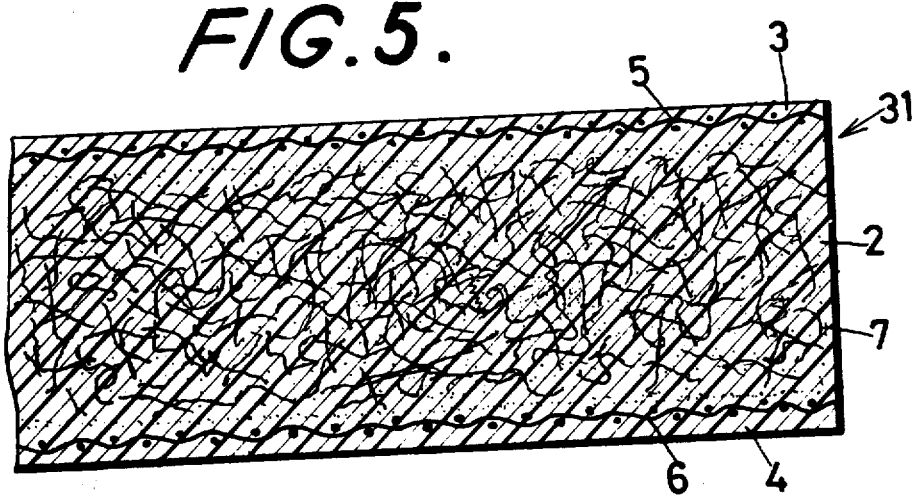

FIGS. 4 and 5 show other embodiments of low-temperature insulating material of this invention. A rigid polyurethane foam 21 illustrated in FIG. 4 has a glass fabric reinforcement 5 embedded only in its inner surface layer 3, whereas a rigid polyurethane foam 31 shown in FIG. 5 is different from the former in that reinforcements 5 and 6 are embedded in inner and outer surface layers 3 and 4 respectively. However, both are of the same construction in that each core layer 1 has a great number of polyamide fibers 7 rendered wavy and embedded therein in intersecting and entangled fashion.

The fibers to be incorporated into the core layer are previously formed in the shape of a mat and placed into a mold along with the reinforcement. Liquid rigid polyurethane is then placed into the mold, followed by foaming, whereby the rigid polyurethane foam described above will be obtained. At the intersections of the fibers, the fibers preferably be joined with one another with adhesive. It is also preferably that the mat made of the fibers and glass reinforcement be joined together with adhesive. The fibers need not be limited to polyamide fibers but any other suitable thermoplastic synthetic resin fibers may likewise be usable. Further employable are fiber-like pieces obtained by shredding a thermoplastic synthetic resin film. Thermoplastic synthetic resin fibers, when used, may advantageously be rendered wavy as already stated or made helical so as to make them bulky and more amenable to entanglement.

In the two embodiments given above the fibers 7 are 0.8 mm in thickness and 5 to 10 mm in length. The fibers 7 embedded in the core layer 2 in intersecting manner serve to add to the overall strength of the rigid polyurethane foams 21 and 31, along with the reinforcement 5 and/or reinforcement 6 embedded in the surface layer 3 and/or surface layer 4. In addition, the fibers 7 act to prevent the possible cracking of the core layer 2.

The present invention may be embodied in other different modes without departing from the spirit and basic features thereof. Accordingly, the embodiments herein disclosed are to be construed as being illustrative but not as limitative in every respect. The scope of this invention is defined by the appended claims rather than by the foregoing detailed description, and all the modifications and alterations within a scope equivalent to that of the claims are to be covered by the claims.

What is claimed is:

1. A molded insulating material adapted for storing cyrogenic liquids comprising:
   a. a core layer of rigid polyurethane foam having a cellular structure and including a plurality of intersecting and entangled fibers embedded therein, said fibers being selected from the group consisting of a thermoplastic resin fiber and a glass fiber, and having
   b. two surface layers of solid polyurethane located on opposite sides of said core layer and integral therewith, said surface layers being substantially free from cells, the thickness of said surface layers being between about 0.3 and about 1.5 mm.,
   c. each surface layer having embedded therein a reinforcement made of woven glass fiber fabric located approximately in the center of said surface layer and extending over the entire area thereof and having a thickness between about 0.2 and about 1 mm., and having a mesh construction of between about 6 × 6 and about 20 × 20 thread elements per square inch.

2. The insulating material of claim 1 in which said fibers are in the form of a mat.

3. The insulating material of claim 1 in which said fibers have a wavy configuration.

4. The insulating material of claim 1 in which said fibers have a helical configuration.

5. The insulating material of claim 1 in which said fibers are previously joined with adhesive at points of intersection.

6. The insulating material of claim 1 in which the thermoplastic resin fiber is a polyamide fiber.

* * * * *